United States Patent
Yonge, III et al.

(10) Patent No.: US 8,700,076 B1
(45) Date of Patent: *Apr. 15, 2014

(54) CLOCK SYNCHRONIZATION AMONG NETWORK STATIONS

(75) Inventors: Lawrence W. Yonge, III, Ocala, FL (US); Srinivas Katar, Gainesville, FL (US); Manjunath Krishnam, Gainesville, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/113,474

(22) Filed: May 23, 2011

Related U.S. Application Data

(63) Continuation of application No. 12/133,233, filed on Jun. 4, 2008, now Pat. No. 7,949,356.

(60) Provisional application No. 60/941,949, filed on Jun. 4, 2007.

(51) Int. Cl.
*H04B 7/01* (2006.01)

(52) U.S. Cl.
USPC ........... 455/502; 455/458; 455/434; 455/515; 370/324; 370/341; 370/342

(58) Field of Classification Search
USPC ......... 455/502, 458, 434, 515, 9, 13.2, 67.11, 455/67.13, 436, 63.1, 13.4, 411, 26.1, 12.1, 455/501, 446; 370/328, 447, 350, 331, 341, 370/324, 181, 337, 443, 294, 503, 338, 347
See application file for complete search history.

(56) References Cited

U.S. PATENT DOCUMENTS

| | | | |
|---|---|---|---|
| 4,578,530 | A | 3/1986 | Zeidler |
| 4,689,786 | A | 8/1987 | Sidhu et al. |
| 4,807,248 | A | 2/1989 | Pyatt et al. |
| 5,328,530 | A | 7/1994 | Semiatin et al. |
| 5,359,625 | A | 10/1994 | Vander Mey et al. |
| 5,570,355 | A | 10/1996 | Dail et al. |
| 5,682,428 | A | 10/1997 | Johnson |

(Continued)

FOREIGN PATENT DOCUMENTS

| | | |
|---|---|---|
| EP | 1748574 | 1/2007 |
| EP | 1748597 | 1/2007 |

(Continued)

OTHER PUBLICATIONS

"U.S. Appl. No. 11/970,339 Office Action", Jun. 18, 2012, 26 pages.

(Continued)

*Primary Examiner* — Tan Trinh
(74) *Attorney, Agent, or Firm* — DeLizio Gilliam, PLLC

(57) ABSTRACT

Communicating among stations in a network includes providing repeated beacon transmissions from at least some of the stations including a first station. The first station is assigned to a first level. Any stations that can reliably receive transmissions from the first station are assigned to a second level. Any stations not assigned to any of the preceding levels that can reliably receive transmissions from the preceding level are assigned to each of one or more higher levels. Timing information at each station in a given level is synchronized according to transmissions received from at least one station in the preceding level.

30 Claims, 5 Drawing Sheets

(56) References Cited

U.S. PATENT DOCUMENTS

| | | | |
|---|---|---|---|
| 5,732,076 A | 3/1998 | Ketseoglou et al. |
| 6,074,086 A | 6/2000 | Yonge, III |
| 6,111,919 A | 8/2000 | Yonge, III |
| 6,141,355 A | 10/2000 | Palmer et al. |
| 6,167,137 A | 12/2000 | Marino et al. |
| 6,173,400 B1 | 1/2001 | Perlman et al. |
| 6,185,185 B1 | 2/2001 | Bass et al. |
| 6,188,690 B1 | 2/2001 | Holden et al. |
| 6,189,040 B1 | 2/2001 | Oohara |
| 6,201,794 B1 | 3/2001 | Stewart et al. |
| 6,243,761 B1 | 6/2001 | Mogul et al. |
| 6,269,132 B1 | 7/2001 | Yonge, III |
| 6,269,163 B1 | 7/2001 | Rivest et al. |
| 6,272,135 B1 | 8/2001 | Nakatsugawa |
| 6,278,685 B1 | 8/2001 | Yonge, III et al. |
| 6,307,940 B1 | 10/2001 | Yamamoto et al. |
| 6,310,892 B1 | 10/2001 | Olkin |
| 6,388,995 B1 | 5/2002 | Gai et al. |
| 6,519,231 B1 | 2/2003 | Ding et al. |
| 6,574,195 B2 | 6/2003 | Roberts |
| 6,591,364 B1 | 7/2003 | Patel |
| 6,606,303 B1 | 8/2003 | Hassel et al. |
| 6,631,136 B1 | 10/2003 | Chowdhury et al. |
| 6,711,163 B1 | 3/2004 | Reid et al. |
| 6,775,656 B1 | 8/2004 | Gettwart et al. |
| 6,804,252 B1 | 10/2004 | Johnson |
| 6,904,462 B1 | 6/2005 | Sinha |
| 6,910,136 B1 | 6/2005 | Wasserman et al. |
| 7,039,021 B1 | 5/2006 | Kokudo |
| 7,085,284 B1 | 8/2006 | Negus |
| 7,181,620 B1 | 2/2007 | Hur |
| 7,234,058 B1 | 6/2007 | Baugher et al. |
| 7,346,021 B2 | 3/2008 | Yoshizawa et al. |
| 7,350,076 B1 | 3/2008 | Young et al. |
| 7,352,770 B1 | 4/2008 | Yonge, III et al. |
| 7,369,579 B2 | 5/2008 | Logvinov et al. |
| 7,409,543 B1 | 8/2008 | Bjorn |
| 7,496,039 B2 | 2/2009 | Yamada et al. |
| 7,506,042 B2 | 3/2009 | Ayyagari |
| 7,558,294 B2 | 7/2009 | Yonge, III et al. |
| 7,558,575 B2 * | 7/2009 | Losh et al. ............ 455/441 |
| 7,573,891 B1 | 8/2009 | Chow et al. |
| 7,609,681 B2 | 10/2009 | Kurobe et al. |
| 7,756,039 B2 | 7/2010 | Yonge, III et al. |
| 7,797,751 B1 | 9/2010 | Hughes et al. |
| 7,804,842 B2 | 9/2010 | Malik et al. |
| 7,826,475 B2 | 11/2010 | Lee et al. |
| 7,826,618 B2 | 11/2010 | Klingler et al. |
| 7,894,487 B2 | 2/2011 | Yonge, III |
| 7,949,356 B2 * | 5/2011 | Yonge et al. ............ 455/502 |
| 7,961,694 B1 | 6/2011 | Chan et al. |
| 8,112,358 B2 | 2/2012 | Yonge, III |
| 8,170,051 B2 | 5/2012 | Yonge, III |
| 8,429,406 B2 | 4/2013 | Yonge et al. |
| 8,467,369 B2 | 6/2013 | Yonge, III et al. |
| 8,488,615 B2 | 7/2013 | Yonge, III et al. |
| 8,503,480 B2 | 8/2013 | Yonge, III et al. |
| 8,510,470 B2 | 8/2013 | Yonge, III et al. |
| 2001/0000709 A1 | 5/2001 | Takahashi et al. |
| 2002/0015496 A1 | 2/2002 | Weaver, III |
| 2002/0025810 A1 | 2/2002 | Takayama et al. |
| 2002/0029260 A1 | 3/2002 | Dobbins et al. |
| 2002/0060986 A1 | 5/2002 | Fukushima et al. |
| 2002/0097679 A1 | 7/2002 | Berenbaum |
| 2002/0107023 A1 | 8/2002 | Chari et al. |
| 2002/0114303 A1 | 8/2002 | Crosbie et al. |
| 2002/0122411 A1 | 9/2002 | Zimmerman et al. |
| 2002/0124177 A1 | 9/2002 | Harper et al. |
| 2002/0137462 A1 | 9/2002 | Rankin |
| 2002/0141417 A1 | 10/2002 | Umayabashi |
| 2003/0012166 A1 | 1/2003 | Benveniste |
| 2003/0018812 A1 | 1/2003 | Lakshminarayana et al. |
| 2003/0022978 A1 | 1/2003 | Hohner et al. |
| 2003/0048183 A1 | 3/2003 | Vollmer et al. |
| 2003/0067892 A1 | 4/2003 | Beyer et al. |
| 2003/0086437 A1 | 5/2003 | Benveniste |
| 2003/0095551 A1 | 5/2003 | Gotoh et al. |
| 2003/0137993 A1 | 7/2003 | Odman |
| 2003/0193959 A1 | 10/2003 | Lui et al. |
| 2003/0224784 A1 | 12/2003 | Hunt et al. |
| 2003/0228846 A1 | 12/2003 | Berliner et al. |
| 2003/0229783 A1 | 12/2003 | Hardt |
| 2004/0047319 A1 | 3/2004 | Elg |
| 2004/0070912 A1 | 4/2004 | Kopp |
| 2004/0081089 A1 | 4/2004 | Ayyagari et al. |
| 2004/0090982 A1 | 5/2004 | Xu |
| 2004/0165532 A1 | 8/2004 | Poor et al. |
| 2004/0190542 A1 | 9/2004 | Ono et al. |
| 2004/0210630 A1 | 10/2004 | Simonnet et al. |
| 2004/0218577 A1 | 11/2004 | Nguyen et al. |
| 2004/0234073 A1 | 11/2004 | Sato et al. |
| 2004/0264428 A1 | 12/2004 | Choi et al. |
| 2005/0001694 A1 | 1/2005 | Berkman |
| 2005/0021539 A1 | 1/2005 | Short et al. |
| 2005/0025176 A1 | 2/2005 | Ko et al. |
| 2005/0068227 A1 | 3/2005 | Caspi et al. |
| 2005/0071631 A1 | 3/2005 | Langer |
| 2005/0089005 A1 | 4/2005 | Sakoda et al. |
| 2005/0114489 A1 | 5/2005 | Yonge, III |
| 2005/0117515 A1 | 6/2005 | Miyake |
| 2005/0117750 A1 | 6/2005 | Rekimoto |
| 2005/0135291 A1 | 6/2005 | Ketchum et al. |
| 2005/0147075 A1 | 7/2005 | Terry |
| 2005/0169222 A1 | 8/2005 | Ayyagari et al. |
| 2005/0190785 A1 | 9/2005 | Yonge, III et al. |
| 2005/0210157 A1 | 9/2005 | Sakoda |
| 2005/0243765 A1 | 11/2005 | Schrader et al. |
| 2005/0249186 A1 | 11/2005 | Kelsey et al. |
| 2006/0002406 A1 | 1/2006 | Ishihara et al. |
| 2006/0039371 A1 | 2/2006 | Castro et al. |
| 2006/0072517 A1 | 4/2006 | Barrow et al. |
| 2006/0077997 A1 | 4/2006 | Yamaguchi et al. |
| 2006/0104301 A1 | 5/2006 | Beyer et al. |
| 2006/0159260 A1 | 7/2006 | Pereira et al. |
| 2006/0168647 A1 | 7/2006 | Chiloyan |
| 2006/0224813 A1 | 10/2006 | Rooholamini et al. |
| 2006/0251017 A1 * | 11/2006 | Bishop ............ 370/330 |
| 2006/0251021 A1 * | 11/2006 | Nakano et al. ............ 370/331 |
| 2006/0252378 A1 * | 11/2006 | Bishop ............ 455/68 |
| 2006/0256741 A1 | 11/2006 | Nozaki |
| 2006/0268746 A1 | 11/2006 | Wijting et al. |
| 2007/0004404 A1 * | 1/2007 | Buckley et al. ............ 455/434 |
| 2007/0019609 A1 | 1/2007 | Anjum |
| 2007/0025244 A1 | 2/2007 | Ayyagari et al. |
| 2007/0025384 A1 | 2/2007 | Ayyagari et al. |
| 2007/0025391 A1 | 2/2007 | Yonge, III et al. |
| 2007/0026794 A1 | 2/2007 | Ayyagari et al. |
| 2007/0030211 A1 | 2/2007 | Frei et al. |
| 2007/0053520 A1 | 3/2007 | Eckleder |
| 2007/0058661 A1 | 3/2007 | Chow |
| 2007/0058732 A1 | 3/2007 | Riedel et al. |
| 2007/0060141 A1 | 3/2007 | Kangude et al. |
| 2007/0097867 A1 | 5/2007 | Kneckt et al. |
| 2007/0115973 A1 | 5/2007 | Koga et al. |
| 2007/0118730 A1 | 5/2007 | Platt |
| 2007/0133388 A1 | 6/2007 | Lee et al. |
| 2007/0133449 A1 | 6/2007 | Schacht et al. |
| 2007/0140185 A1 | 6/2007 | Garg et al. |
| 2007/0147322 A1 | 6/2007 | Agrawal et al. |
| 2007/0189189 A1 | 8/2007 | Andrews et al. |
| 2007/0220570 A1 | 9/2007 | Dawson et al. |
| 2007/0254596 A1 * | 11/2007 | Corson et al. ............ 455/68 |
| 2007/0271398 A1 | 11/2007 | Manchester et al. |
| 2007/0286074 A1 | 12/2007 | Xu |
| 2007/0286111 A1 * | 12/2007 | Corson et al. ............ 370/319 |
| 2008/0002599 A1 | 1/2008 | Yau et al. |
| 2008/0151820 A1 | 6/2008 | Solis et al. |
| 2008/0181219 A1 | 7/2008 | Chen et al. |
| 2008/0186230 A1 | 8/2008 | Wengler et al. |
| 2008/0212591 A1 | 9/2008 | Wu et al. |
| 2008/0222447 A1 | 9/2008 | Ram et al. |
| 2008/0247408 A1 | 10/2008 | Yoon et al. |
| 2008/0267106 A1 | 10/2008 | Buddhikot et al. |
| 2008/0279126 A1 | 11/2008 | Katar et al. |

(56) References Cited

U.S. PATENT DOCUMENTS

| | | |
|---|---|---|
| 2008/0298252 A1 | 12/2008 | Yonge, III |
| 2008/0298589 A1 | 12/2008 | Katar et al. |
| 2008/0298590 A1 | 12/2008 | Katar et al. |
| 2008/0298594 A1 | 12/2008 | Yonge, III |
| 2008/0301052 A1 | 12/2008 | Yonge, III |
| 2008/0301446 A1 | 12/2008 | Yonge, III |
| 2008/0310414 A1 | 12/2008 | Yonge, III |
| 2009/0010276 A1* | 1/2009 | Yonge et al. ............... 370/447 |
| 2009/0034552 A1 | 2/2009 | Yonge, III |
| 2009/0040930 A1 | 2/2009 | Yonge, III |
| 2009/0067389 A1 | 3/2009 | Lee et al. |
| 2009/0074007 A1 | 3/2009 | Yonge, III |
| 2009/0092075 A1* | 4/2009 | Corson et al. ............... 370/328 |
| 2009/0106551 A1 | 4/2009 | Boren et al. |
| 2009/0116461 A1 | 5/2009 | Yonge, III et al. |
| 2009/0154487 A1 | 6/2009 | Ryan et al. |
| 2009/0207769 A1 | 8/2009 | Park et al. |
| 2009/0311963 A1 | 12/2009 | Haverty |
| 2010/0014444 A1 | 1/2010 | Ghanadan et al. |
| 2010/0091760 A1 | 4/2010 | Yoon |
| 2010/0100724 A1 | 4/2010 | Kaliski, Jr. |
| 2012/0072715 A1 | 3/2012 | Yonge, III |
| 2013/0235730 A1 | 9/2013 | Yonge, III |
| 2013/0272315 A1 | 10/2013 | Yonge, III et al. |

FOREIGN PATENT DOCUMENTS

| | | |
|---|---|---|
| EP | 1179919 | 7/2010 |
| JP | 3107317 A | 5/1991 |
| JP | 2002135177 A | 5/2002 |
| JP | 2005073240 A | 3/2005 |
| WO | WO9634329 A1 | 10/1996 |
| WO | WO9857439 A1 | 12/1998 |
| WO | WO02103943 A1 | 12/2002 |
| WO | 03/100996 | 12/2003 |
| WO | 2004/038980 | 5/2004 |

OTHER PUBLICATIONS

"U.S. Appl. No. 12/108,334 Office Action", Aug. 3, 2012, 18 pages.
"U.S. Appl. No. 12/133,301 Final Office Action", Sep. 26, 2012, 54 pages.
"U.S. Appl. No. 12/133,315 Office Action", Aug. 9, 2012, 37 pages.
Muir A., et al., "An Efficient Packet Sensing MAC Protocol for Wireless Networks", Computer Engineering Department School of Engineering, University of California, Aug 1998, pp. 20.
Notification of First Office Action, The State Intellectual Property Office of the People's Republic of China, issued in Chinese Application No. 200880100486.9 17 pages. Nov. 21, 2012.
U.S. Appl. No. 11/970,339 Final Office Action. 25 pages. Dec. 11, 2012.
U.S. Appl. No. 13/303,913 Office Action. 37 pages. Dec. 26, 2012.
European Search Report, European Patent Office, European Patent Application No. 06253916.8-1246, Oct. 31, 2006, 8 pages.
HomePlug Powerline Alliance Inc., "HomePlug AV White Paper," Doc. Ver. No. HPAVWP-050818, Aug. 2005, pp. 1-11.
Katar et al., "Beacon Schedule Persistence to Mitigate Beacon Loss in HomePlug AV Networks," May 2006, IEEE 1-4244-0113-05/06, pp. 184-188.
Lee et al., "HomePlug 1.0 Powerline Communication LANs-Protocol Description and Performance Results version 5.4," 2000, International Journal of Communication Systems, 2000 00:1-6, pp. 1-25.
Afkhamie et al., "An Overview of the upcoming HomePlug AV Standard", May 2005, IEEE 0-7803-8844-5/05, pp. 400-404.
European Search Report—EP09178487, Search Authority, Munich Patent Office, Jan. 21, 2010.
Faure, Jean-Philippe et al., Call for Submissions. Draft Standard for Broadband over Power Line Networks: Medium Access Control and Physical Layer Specifications. Feb. 14, 2007, 4 pages.

Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.
International Search Report and Written Opinion—PCT/US2008/065811, International Searching Authority, European Patent Office, Nov. 25, 2008.
International Search Report and Written Opinion—PCT/US2008/065831, International Searching Authority, European Patent Office, Feb. 20, 2009, 22 pages.
Loh et al, Quality of Support and priority Management in HomePNA 2.0 Link Layer, IEEE, 6 pages, 2003.
Notification of First Office Action, The State Intellectual Property Office of the People's Republic of China, issued in Chinese Application No. 200610107587.1, dated Oct. 11, 2010, 6 pages.
Notification of Reasons for Rejection, Japanese Patent Office, issued in Japanese Patent Application No. 2006-205200, dated Jan. 18, 2011, 3 pages.
Opera Specification-Part 1: Technology, Open PLC European Research Alliance, 198 pages, 1006.
"U.S. Appl. No. 11/970,297 Final Office Action", Apr. 16, 2012, 32 pages.
"U.S. Appl. No. 12/133,301 Office Action", Mar. 1, 2012, 38 pages.
"U.S. Appl. No. 11/970,271 Final Office Action", Jul. 19, 2011, 21 pages.
"U.S. Appl. No. 11/970,271 Office Action", Mar. 9, 2012, 19 pages.
"U.S. Appl. No. 11/970,271 Office Action", Oct. 7, 2011, 20 pages.
"U.S. Appl. No. 11/970,271 Office Action", Dec. 7, 2010, 21 pages.
"U.S. Appl. No. 11/970,297 Office Action", Mar. 30, 2011 30 pages.
"U.S. Appl. No. 11/970,297 Office Action", Sep. 29, 2011, 31 pages.
"U.S. Appl. No. 11/970,323 Office Action", Dec. 7, 2010, 12 pages.
"U.S. Appl. No. 11/970,339 Final Office Action", Jul. 7, 2011, 14 pages.
"U.S. Appl. No. 11/970,339 Office Action", Jan. 19, 2011, 22 pages.
"U.S. Appl. No. 11/971,446 Final Office Action", Jul. 1, 2011, 17 pages.
"U.S. Appl. No. 11/971,446 Office Action", Feb. 15, 2011, 20 pages.
"U.S. Appl. No. 12/108,334 Final Office Action", Jun. 14, 2011, 28 pages.
"U.S. Appl. No. 12/108,334 Office Action", Aug. 3, 2010, 20 pages.
"U.S. Appl. No. 12/108,334 Office Action", Feb. 16, 2011, 26 pages.
"U.S. Appl. No. 12/133,270 Final Office Action", Nov. 18, 2011, 23 pages.
"U.S. Appl. No. 12/133,270 Office Action", Jun. 3, 2011, 67 pages.
"U.S. Appl. No. 12/133,301 Final Office Action", Mar. 22, 2011, 39 pages.
"U.S. Appl. No. 12/133,301 Office Action", Sep. 22, 2010, 42 pages.
"U.S. Appl. No. 12/133,312 Final Office Action", Feb. 16, 2011, 24 pages.
"U.S. Appl. No. 12/133,312 Office Action", Jun. 8, 2011, 24 pages.
"U.S. Appl. No. 12/133,312 Office Action", Jul. 28, 2010, 29 pages.
"U.S. Appl. No. 12/133,315 Final Office Action", Jul. 20, 2010, 30 pages.
"U.S. Appl. No. 12/133,315 Final Office Action", Jun. 9, 2011, 38 pages.
"U.S. Appl. No. 12/133,315 Office Action", Dec. 24, 2009, 28 pages.
"U.S. Appl. No. 12/133,315 Office Action", Dec. 28, 2010, 36 pages.
"U.S. Appl. No. 12/133,325 Final Office Action", Dec. 9, 2010, 33 pages.
"U.S. Appl. No. 12/133,325 Office Action", May 27, 2010, 31 pages.
"U.S. Appl. No. 12/133,301 Office Action", Sep. 25, 2013, 44 pages.
Co-pending U.S. Appl. No. 13/873,168, filed Apr. 29, 2013, 34 pages.
Co-pending U.S. Appl. No. 13/917,394, filed Jun. 13, 2013, 20 pages.
U.S. Appl. No. 11/970,339 Office Action, Jun. 27, 2013, 22 pages.
Co-pending U.S. Appl. No. 13/933,924, filed Jul. 2, 2013, 36 pages.
U.S. Appl. No. 11/971,446 Office Action, 19 pages, Feb. 14, 2014.
"U.S. Appl. No. 13/873,168 Office Action", Dec. 16, 2013, 23 pages.
U.S. Appl. No. 11/970,339 Final Office Action, 27 pages, Jan. 3, 2014.

* cited by examiner

CLOCK SYNCHRONIZATION AMONG NETWORK STATIONS

CROSS-REFERENCE TO RELATED APPLICATIONS

This application is a continuation of U.S. patent application Ser. No. 12/133,233, entitled "CLOCK SYNCHRONIZATION OVER A SHARED MEDIUM", filed on Jun. 4, 2008 now U.S. Pat. No. 7,949,356, which claims priority to U.S. Provisional Application Ser. No. 60/941,949, entitled "MANAGING COMMUNICATIONS OVER A SHARED MEDIUM," filed on Jun. 4, 2007, both of which are herein incorporated by reference as though fully and completely set forth herein.

TECHNICAL FIELD

The invention relates to managing clock synchronization over a shared medium.

BACKGROUND

A network of communication stations can use any of a variety of clock recovery techniques to correct for clock error before decoding a packet or data stream. Various techniques for clock recovery are based on detecting portions of transmitted signals (e.g., a preamble that can also be used to detect the start of a data packet). For example, Digital Video Broadcasting (DVB) standards for digital television include techniques for clock recovery based on a continuous stream including pilot carriers that can be used to synchronize a local phase-locked loop used for decoding the stream. However, such techniques may not be appropriate in networks in which multiple stations may be transmitting data.

SUMMARY

In one aspect, in general, a method for communicating among stations in a network includes providing repeated beacon transmissions from at least some of the stations including a first station, where the first station is assigned to a first level. The method includes assigning any stations that can reliably receive transmissions from the first station to a second level. The method includes assigning to each of one or more higher levels any stations not assigned to any of the preceding levels that can reliably receive transmissions from the preceding level. The method includes synchronizing timing information at each station in a given level according to transmissions received from at least one station in the preceding level.

In another aspect, in general, a method for communicating among stations in a network includes providing repeated beacon transmissions from at least some of the stations including a first station. The first station is assigned to a first level. For each given station other than the first station, a station is determined from which transmissions can be reliably received that has the lowest level, and the given station is assigned to a level that is one higher than the level of the determined station. Timing information at each station in a given level is synchronized according to transmissions received from at least one station in the preceding level.

In another aspect, in general, a system for communicating among stations in a network includes a first station assigned to a first level; a first set of one or more stations that can each reliably receive transmissions from the first station assigned to a second level; and one or more additional sets of one or more stations that can reliably receive transmissions from at least one station in the preceding level, each set assigned to a given level configured to synchronize timing information according to transmissions received from at least one station in the preceding level.

Aspects can include one or more of the following features.

Synchronizing the timing information at a given station comprises synchronizing a local clock used to sample received transmissions at the station.

Synchronizing the timing information at a given station comprises synchronizing a local clock used to prepare transmissions from the station.

Synchronizing the timing information at a given station in a given level comprises synchronizing a prediction of a periodic time reference based on timing information in a transmission received from at least one station in the preceding level.

Each of at least some of the beacon transmissions from a given station includes at least one of: a timestamp of a clock at the given station, and time delay information indicating a time delay between a periodic time reference and a time associated with the beacon transmission from the given station.

Synchronizing the timing information at a given station comprises synchronizing a clock at the given station based on the timestamp in a received beacon transmission.

Synchronizing the timing information at a given station includes: tracking a position in an AC line cycle, and using the time delay information in a received beacon transmission to predict future occurrences of the periodic time reference relative to the tracked AC line cycle position.

The position in the AC line cycle comprises a zero crossing.

The method further comprises using the predicted future occurrence of the periodic time reference in response to not receiving a beacon transmission at an expected time.

Synchronizing the timing information at a given station includes: tracking a clock at the given station, and using the time delay information in a received beacon transmission to predict future occurrences of the periodic time reference relative to the tracked clock.

The method further comprises updating the tracked clock using information from beacon transmissions.

Aspects can have one or more of the following advantages.

In some networks it is useful to have tight synchronization of clocks at various nodes (or "stations") in the network. One application of tightly synchronized clocks is to enable cost saving at the physical layer. In some cases, physical layer signaling requires the clock of a receiver to be within a certain offset (e.g., 1 part per million) of the clock of a transmitter for proper operation. The cost of circuitry (e.g., clock crystals) of highly accurate clocks to provide such a low offset may be expensive. As an alternative to highly accurate clocks, clocks with lower precision can be used along with a clock synchronization mechanism that enables stations to compensate for a given clock offset. The synchronization techniques can be used to synchronize the physical layer (PHY) signaling between stations to eliminate inter-carrier interference without the need for highly accurate clocks. Synchronization can also enable tight control of jitter within the network. For example, an audio streaming application may require that multiple speakers play music in a synchronized manner. Since typical networks create jitter, a clock synchronization mechanism that synchronizes the clocks at all of the speakers and indicates the time at which each audio packet is to be played at each speaker can be used.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
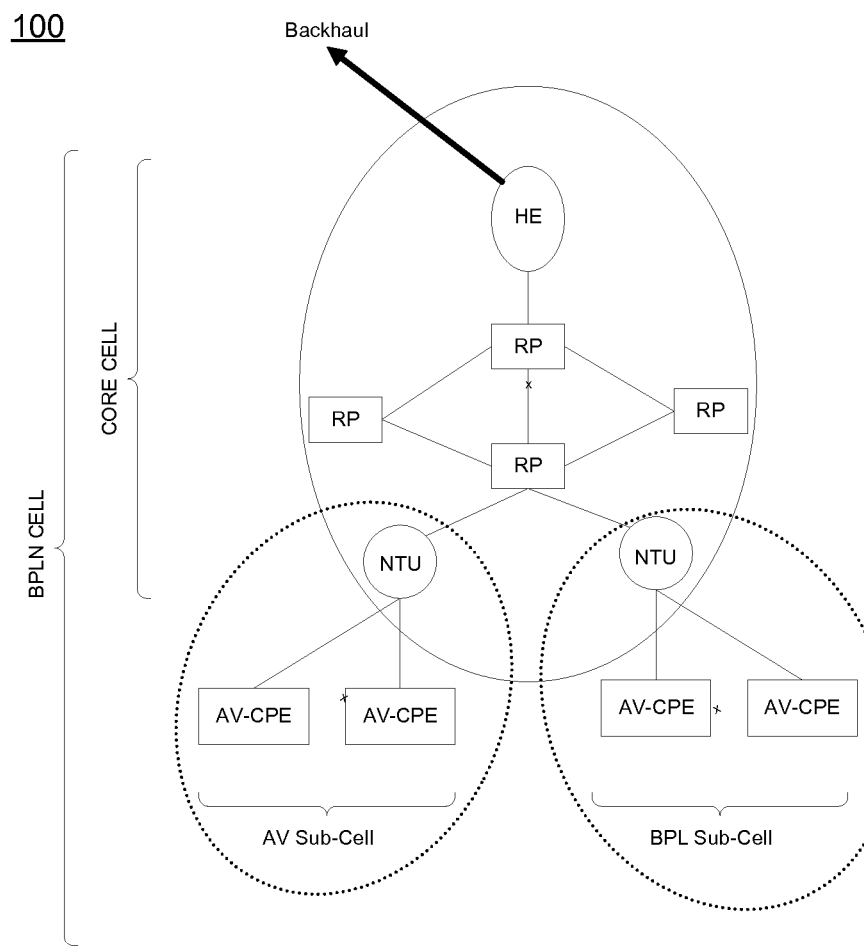
FIG. 1 is a schematic diagram of a communication network.

FIG. 1 shows an exemplary network configuration for an access network 100 such as a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more Cells. A cell is a group of broadband power line (BPL) devices in a BPLN that have similar characteristics such as association management, security, Quality of Service (QoS) and channel access settings, for example. Cells in a BPLN are logically isolated from each other, and communication to and from the backhaul occurs within the cell. Each cell in a BPLN includes a Core-Cell and may also include one or more Sub-Cells. There can be more than one cell on a given physical power line medium.

A Core-Cell includes a group of devices in a BPLN that can share certain functionality such as a common security protocol. An exemplary Core-Cell includes a Head End (HE), Repeaters (R), and Network Termination Units (NTUs), but may exclude Customer Premise Equipment (CPE). The Head End (HE) is a device that bridges a cell to the backhaul network. At a given time, a cell will have one active Head End and the Head End manages the cell including the Core-Cell and any associated Sub-Cells. A Repeater (RP) is a device that selectively retransmits MSDUs to extend the effective range and bandwidth of the BPLN Cell. Repeaters can also perform routing and QoS functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

Various types of CPE devices (e.g., a computer) can be used as endpoint nodes in the network and such devices can communicate with other nodes in the network through the NTU, any number of repeaters, (e.g., including no repeaters), and the Head End. Each node in the network communicates as a communication "station" using a PHY layer protocol that is used by the nodes to send transmissions to any other stations that are close enough to successfully receive the transmissions. Stations that cannot directly communicate with each other use one or more repeater stations to communicate with each other. The stations have the potential to interfere with each other, but techniques can be used to coordinate in a centralized and/or distributed manner.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. A preferred implementation of the MAC and PHY layers used by powerline medium is that based on HomePlug AV specification.

One implementation of the PHY layers is to use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
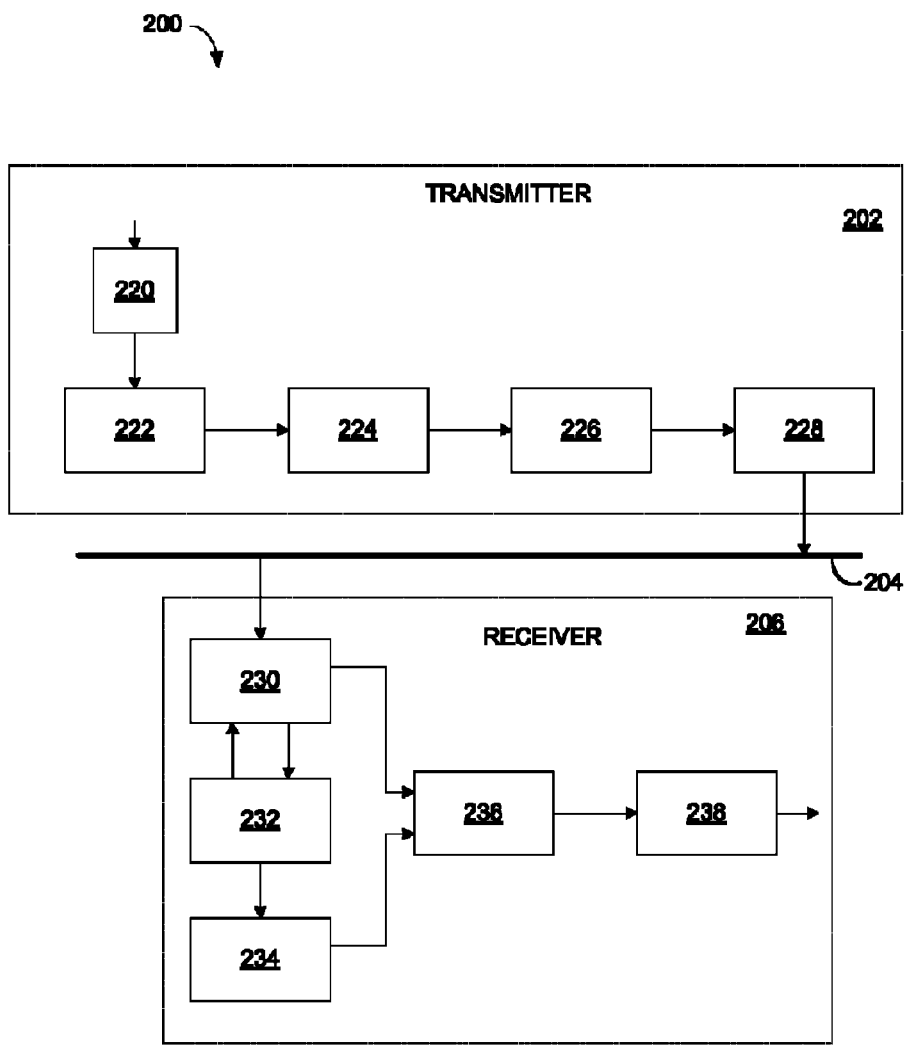
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n / N + \Phi_i)] \quad \text{Eq. (1)}$$

where the time index n goes from 1 to N, Ai is the amplitude and $\Phi_i$ is the phase of the carrier with peak frequency $f_i = (i/N) f_R$, and $j = \sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau;t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Various stations in a network may generate regular beacon transmissions for various purposes. A beacon transmission (or simply a "beacon") includes management information that can be used for a variety of purposes. The stations may communicate with each other in time periods between beacon transmissions, provided the power line channel characteristics between any two communicating stations permit it.

In some networks one of the functions of a beacon transmission is to carry medium allocation (or scheduling) information. The scheduling information allocates some of the time between beacon transmissions as a contention period during which stations may contend for access to the power line medium. The scheduling information also allocates a contention-free period during which times slots are assigned to particular stations for access to the power line medium. The scheduling information is provided relative to a TDMA Scheduling Period Start Time (or TDMA Period Start Time).

The TDMA Period start time is synchronized with respect to the AC line cycle of the power line waveform such that the time between consecutive TDMA period start times is based on the underlying AC line cycle frequency. Thus, to the extent that the AC line cycle frequency may vary, the TDMA period start time (and hence the duration of each TDMA Period) may not be perfectly periodic. Since the beacons transmitted by the HE may not be heard by every station, each station transmits its own beacon to relay the information in the beacon to stations that do not hear the HE. While the stations may transmit their beacons at different times, the TDMA period start time is established with respect to the information contained in the beacons transmitted by the HE. At each station, the TDMA period start time can be synchronized to that of the HE using a start time synchronization procedure described in more detail below. Each station can then predict a given TDMA period end time (or future TDMA period start time) based on the synchronized start time and the local AC line cycle at the given station by correlating the synchronized start time to a detectable feature of the power line waveform such as a zero crossing. The TDMA period can be set by the HE to any multiple of a half of the AC line cycle period, for example, by waiting for a given number of zero crossings.

In the absence of the AC line cycle such as on a DC power bus or on other medium such as coax or phone lines, the TDMA Period may be based on or synchronized to the Network Time Base (NTB). In this case, the HE would communicate the period and timing of the TDMA period to other stations in the network base on the NTB. The NTB is a network wide clock provided by the HE whose current clock value is included in the beacon (e.g. 32 bit NTB clock value based on a 25 MHz clock). Each station that can directly hear the HE will recover the NTB locally from the information communicated in the HE's beacon and will include the locally recovered NTB in their own beacon transmission for use by stations that cannot hear the HE directly. Stations that cannot hear the HE directly will recover the NTB from another station that it can directly hear that is nearer to the HE than itself and will also include the locally recovered NTB in their own beacon transmission. This provides a means for all in the network stations to recover the NTB. CPEs do not need to transmit the NTB in a beacon.

In some cases it is desirable to increase the TDMA period to make more efficient use of the medium by reducing the percentage of time devoted to sending the "overhead" information in the beacon transmission. There is also overhead information associated with transmissions from the stations during each TDMA period. It may also be desirable to keep the TDMA period small enough to provide a desired number of transmission opportunities in a given length of time to reduce the latency. Thus, the TDMA period can be selected according to a trade-off between keeping overhead low and latency between transmission opportunities low. For example, in some implementations the TDMA period is selected to be twice the AC line cycle period. In this case, when operating in power line environments with an AC line cycle frequency of 60 Hz, the TDMA period would be approximately 33.33 msec. When operating in power line environments with an AC line cycle frequency of 50 Hz, the TDMA period would be approximately 40 msec. Variations in the TDMA period may occur due to drift in the AC line cycle frequency. The HE determines the duration of the TDMA period as well as the start time of the TDMA period. In order to reduce latency, more than one time slot may be assigned to a station during a TDMA period.

Figure 3:
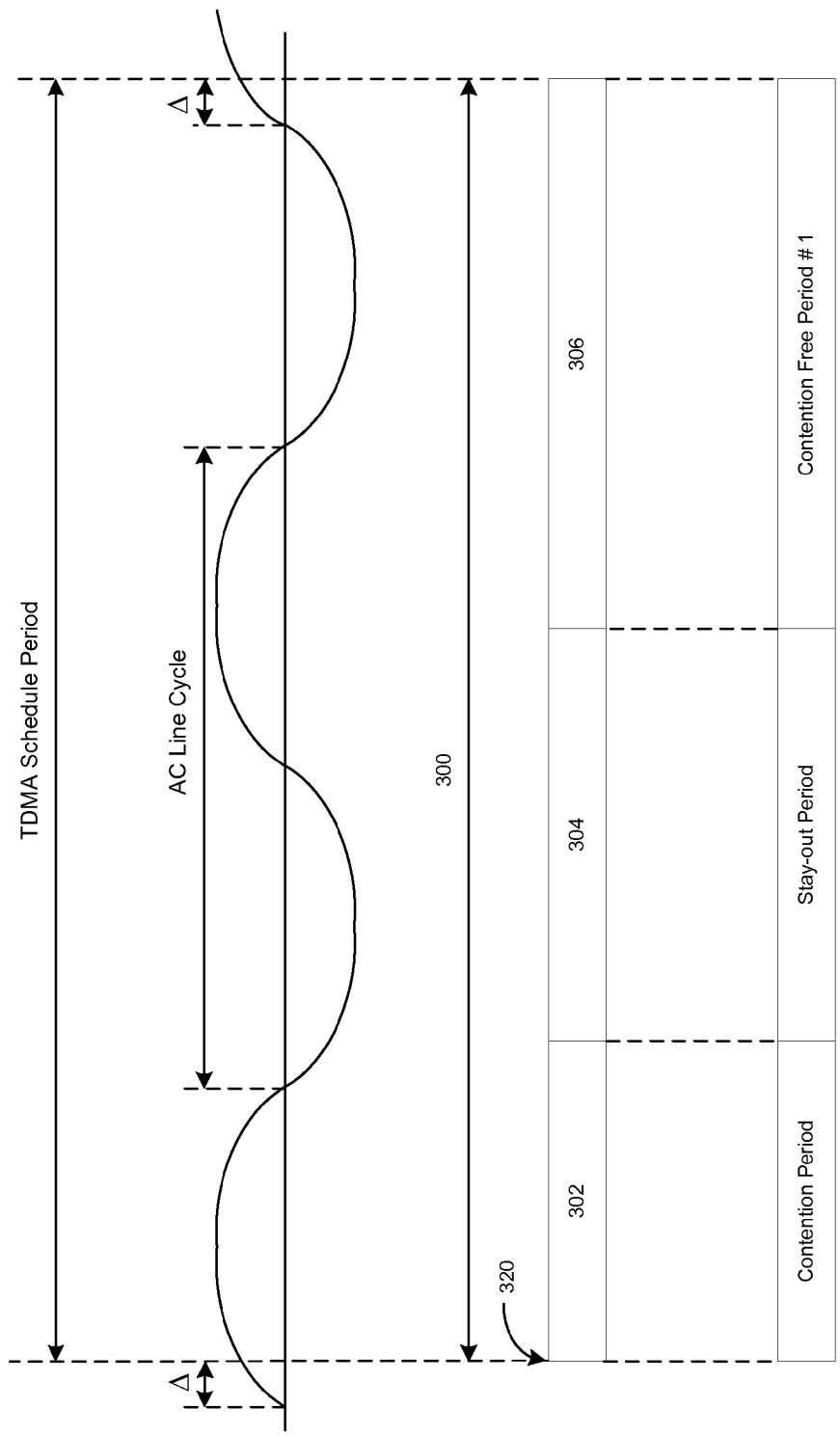
FIG. 3 is a timing diagram of a TDMA period.

FIG. 3 shows the structure of an exemplary TDMA period 300 which consists of a Contention Period 302 followed by a Stay-out Period 304 and a Contention Free Period 306. In general, a TDMA period can contain any number of Contention Periods, Stay-out Periods and Contention Free Periods in any order. The TDMA period may also be different for different stations in the BPLN. The Contention Period 302 is a time in which stations can contend for permission to transmit using a shared medium access protocol such as CSMA/CA. The Stay-out Period 304 is a time during which stations are not allowed to transmit. The Contention Free Period 306 includes time slots assigned for use by predetermined stations (e.g., using a Time Domain Multiple Access (TDMA) protocol). Beacons are typically transmitted during the Contention Period. Beacon may also be transmitted during Contention Free Periods. The frequency of beacon transmission depends on how frequently the associated management information needs to be communicated. Typically, beacons are transmitted once in several TDMA periods.

In networks in which repeaters are used to extend the reach of signals in the network, multiple stations can retransmit beacon transmissions to be heard by stations that would otherwise not be able to receive the beacon transmissions from the HE.

Synchronization can be achieved in a network with the head end as a "master" and multiple levels of stations that are formed based on which stations are able to hear certain other stations' beacon transmissions. The synchronization can be used to: correct a local PHY clock used for the processing of transmitted and received signals at the stations, announce the future TDMA period start times and schedules relative to the TDMA period, and perform other functions such as jitter control. The synchronization can be performed in a hierarchical manner such that stations can synchronize to other stations from which they can reliably receive beacon transmissions. Thus, not all stations need to be able to reliably receive messages from the HE in order to maintain synchronization with a clock at the HE. A "Beacon Level" can be used as part of a "network time base synchronization" and a "start time synchronization" within the network.

Each station in the BPLN broadcasts a beacon transmission regularly but not necessarily at the same time (or at the same frequency) at which the HE broadcasts beacon transmissions. For example, a Repeater station may transmit its beacon within a given target maximum delay (e.g., 100 ms) after reception of the beacon it is tracking.

The beacon transmission can contain many fields including the Beacon Level (BL) and Beacon Time Stamp (BTS). The BL and BTS are used to obtain network time base synchronization. The HE is considered to be a Beacon Level 0 station and it sets the BL field in the beacon transmission to be zero. All the stations that can reliably receive (or "hear") the beacon transmissions sent by the HE (with BL=0) are Beacon Level 1 stations and set the BL field in their beacon transmissions to 1. For all other stations, the BL is one higher than the smallest BL of all the stations it can reliably hear.

The HE maintains a timer circuit (e.g., a 32-bit timer circuit such as a counter), called the Network Time Base (NTB) timer, clocked by high-frequency clock (e.g., a 25 MHz clock). Each of the other stations also maintains its own NTB timer that represents an estimate of the NTB timer at the HE station. The stations other than the HE maintain their NTB timer using a local clock, and regularly update their NTB timer using recently received NTB timer values from beacon transmissions of the lowest level (the level closest to the level of the HE) station that it can hear. Any of a variety of techniques can be used to update the NTB timers including adjustable circuitry and/or offset formulas computed by a processor. The HE sets the BTS field of the beacon transmission to be the value of the NTB timer at the time the beacon transmission is sent (e.g., the time instant at which the first non-zero sample of the beacon transmission appears on the transmitter's analog output), called the Beacon Transmit Time (BTT). The Beacon Level 1 stations track the beacon transmissions received from the HE, and use the BTS in the received beacon transmission to update the NTB timer maintained by that station. The Beacon Level 1 stations can also correct their local clocks using this information. The Beacon Level 1 stations in turn send beacon transmissions with the BTS field set to the value of their NTB timer at the time of their beacon transmission. This process continues with each station using the BTS field information of beacons reliably received from stations with lowest BL to update their own NTB timer. Using this approach, all the stations in the BPL network can be synchronized in a hierarchical manner. The NTB timer maintained by each station can be updated by synchronizing in frequency and/or value to the NTB timer maintained at the HE via the received BTS values.

Figure 4:
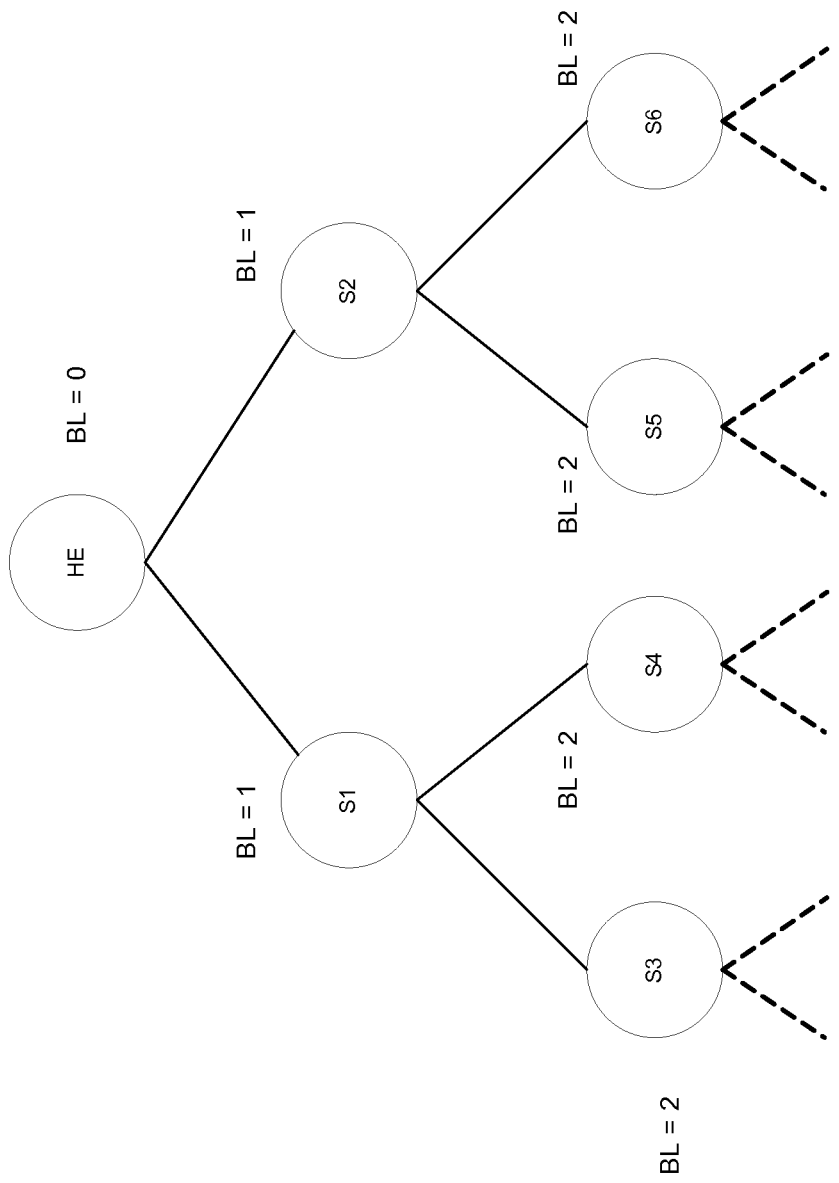
FIG. 4 is a diagram of stations grouped into beacon levels.

FIG. 4 shows an example of stations grouped into Beacon Levels for network time base synchronization. A group of stations labeled HE and S1-S6 may be a head end and a group of repeaters in a BPLN, for example. The stations are shown arranged in a graph with a line between stations that represents the ability to reliably receive a beacon transmission. In this example, stations S1 and S2 are Beacon Level 1 stations and S3, S4, S5 and S6 are Beacon Level 2 stations. Stations S1 and S2 use the BTS transmitted by the HE to update their NTB timers and in turn transmit beacons with the BTS set appropriately. Stations S3 and S4 use the BTS transmitted by R1 to update their respective NTB timers, and stations S5 and S6 use the BTS transmitted by R2 to update their respective NTB timers.

Start time synchronization can be used to establish TDMA period start times as a series of repeating shared time references ("Start Times") that can be used, for example, to generate and enforce non-interfering local TDMA schedules or for channel adaptation purposes (for example, adapt differently at different portions of the TDMA period). This may be required, for example, because stations may be on different phases of the AC line cycle, and even if their relative phase offsets were known, there may be local noise in the zero cross detection circuit can distort the detection of actual position of the zero crossings making it hard to establish a shared time reference from the power line waveform alone. Each station transmits a Start Time Offset (STO) as one of the fields of its beacon transmission. The STO value corresponds to the time offset of the beacon being transmitted with respect to the shared Start Time of the network. The HE determines the Start Time according to a local time reference (e.g., the zero crossing of its AC line cycle). The other stations compute the Start Time using the STO field of the beacon it reliably received from the station with the lowest beacon level. Similar to the network time base synchronization, the start time synchronization is achieved in a hierarchical manner using the BL field and the STO field (instead of the BTS field) in the beacon.

Figure 5:
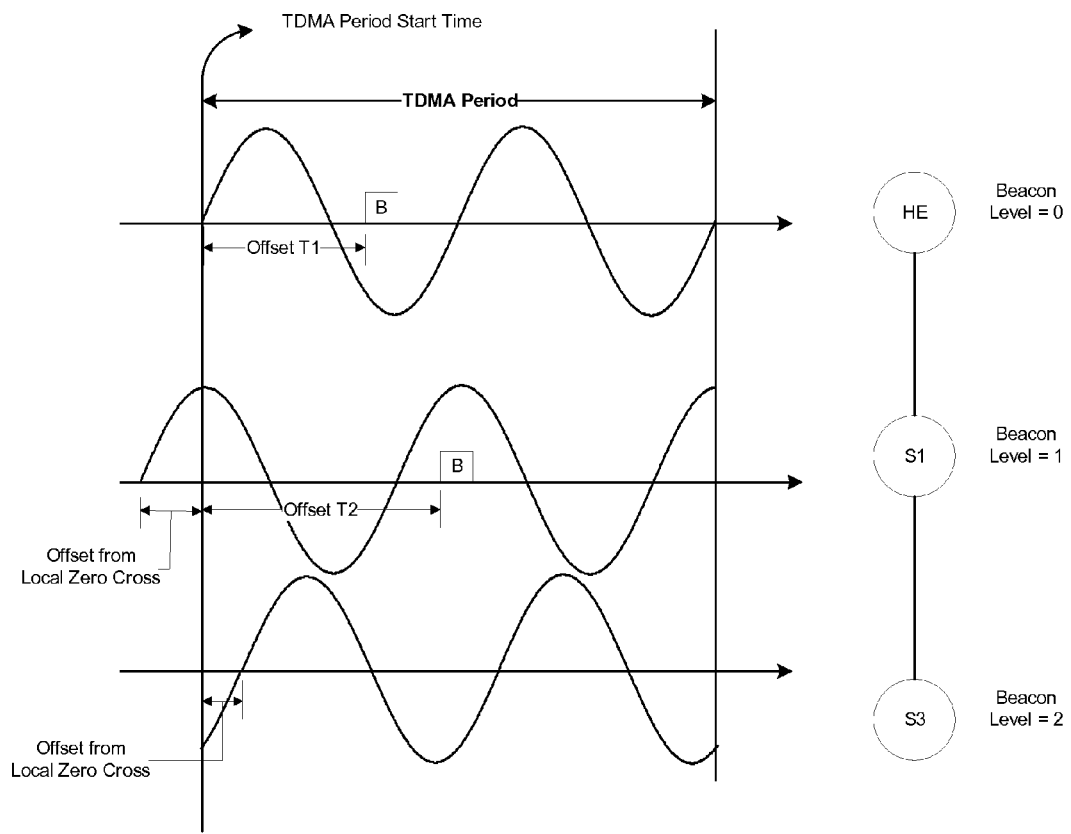
FIG. 5 is a schematic diagram illustrating synchronization.

FIG. 5 shows an example of the tracking and synchronization of a Start Time of a TDMA period that is two line cycles long and aligned with the zero crossing of the HE station. In this example, the local power line waveform of HE, S1 and S2 are offset in phase from each other, but the stations are still able to establish a shared Start Time that has a different offset from each local zero crossing. The HE station transmits a beacon with the STO field set to T1. When any Beacon Level 1 station such as S1 hears the beacon, it can determine an estimate of the Start Time by subtracting T1 from the time the beacon was received. When S1 transmits a beacon, the STO field is set to T2, which is the time between the estimated Start Time and the time of transmission of its beacon. Station S3 is a Beacon Level 2 station and uses the STO value of T2 in the beacon received from station S1 to determine an estimate of the Start Time. In this manner, all the higher beacon level stations can synchronize their estimate of the Start Time using information from the beacon received reliably from the station with the lowest beacon level.

A station can predict the location of any number of future Start Times using any combination of their NTB timer, their local clock, and/or their local power line waveform. Additionally, even though a station may have been established as a Beacon Level N+1 station that reliably receives beacons from a Beacon Level N station, the station may occasionally miss a beacon due to the beacon being not received successfully or perhaps not being transmitted for some reason. If a given station does not receive a beacon transmission as expected, the station may also infer the location of a previous Start Time based on one or more previous STO values received in earlier beacons and any combination of their NTB timer, their local clock, and/or their local power line waveform. For example, line-cycle synchronization can be achieved by tracking a particular point in the AC line cycle using a Digital Phase Locked Loop (DPLL) or equivalent. Each station can use its local tracking history to predict future locations of the TDMA period Start Times.

Many other implementations of the invention other than those described above are within the invention, which is defined by the following claims.

1. A system for communicating among stations in a network, the system comprising:
a first station assigned to a first level in the network;
a second station assigned to a second level and configured to receive a transmission from the first station; and
a third station assigned to a third level and configured to receive a transmission from the second station, wherein the third station is configured to synchronize a first timing information based on the transmission received from the second station, wherein synchronizing the first timing information comprises synchronizing a prediction of a periodic time reference based on a second timing information included in the transmission received from the second station.

2. The system of claim 1, wherein synchronizing the first timing information at the third station further comprises synchronizing a first clock used to sample transmissions received at the third station.

3. The system of claim 1, wherein synchronizing the first timing information at the third station further comprises synchronizing a first clock used to prepare transmissions from the third station.

4. The system of claim 1, wherein the transmission received from the second station includes at least one of: a timestamp of a second clock at the second station, and time delay information indicating a time delay between the periodic time reference and a time associated with the transmission from the second station.

5. The system of claim 4, wherein synchronizing the first timing information at the third station comprises synchronizing a first clock at the third station based on the timestamp in the transmission received from the second station.

6. The system of claim 4, wherein synchronizing the first timing information at the third station includes: tracking a position in an AC line cycle, and using the time delay information in the transmission received from the second station to predict future occurrences of the periodic time reference relative to the AC line cycle position.

7. The system of claim 6, wherein the position in the AC line cycle includes a zero crossing.

8. The system of claim 6, further comprising using a predicted future occurrence of the periodic time reference in response to not receiving the transmission from the second station at an expected time.

9. The system of claim 4, wherein synchronizing the first timing information at the third station includes: tracking a first clock at the third station, and using the time delay information in the transmission received from the second station to predict future occurrences of the periodic time reference relative to the first clock.

10. The system of claim 9, further comprising updating the first clock using information from a beacon transmission.

11. A first station for communicating in a network, the first station comprising:
 a transmitter configured to transmit a beacon in the network; and
 a receiver assigned to a first level in the network, the receiver configured to:
  receive a transmission from a second station in a preceding level, and
  synchronize a first timing information according to the transmission received from the second station in the preceding level, wherein synchronizing the first timing information comprises synchronizing a prediction of a periodic time reference based on a second timing information included in the transmission received from the second station.

12. The first station of claim 11, wherein the receiver is further configured to synchronize the first timing information by synchronizing a first clock at the first station used to sample the transmission received from the second station.

13. The first station of claim 11, wherein the receiver is further configured to synchronize the first timing information by synchronizing a first clock at the first station used to prepare the beacon for transmission from the transmitter.

14. The first station of claim 11, wherein the transmission received from the second station includes at least one of: a timestamp of a second clock at the second station, and time delay information indicating a time delay between the periodic time reference and a time associated with the transmission from the second station.

15. The first station of claim 14, wherein the receiver is further configured to synchronize the first timing information by synchronizing a first clock at the first station based on the timestamp in the transmission received from the second station.

16. The first station of claim 14, wherein the receiver is further configured to synchronize the first timing information by tracking a position in an AC line cycle, and use the time delay information in the transmission received from the second station to predict future occurrences of the periodic time reference relative to the AC line cycle position.

17. The first station of claim 16, wherein the position of the AC line cycle includes a zero crossing.

18. The first station of claim 16, wherein the receiver is further configured to use a predicted future occurrence of the periodic time reference in response to not receiving a transmission at an expected time.

19. The first station of claim 14, wherein the receiver is further configured to synchronize the first timing information by tracking a first clock at the first station, and use the time delay information in the transmission received from the second station to predict a future occurrence of the periodic time reference relative to the first clock.

20. The first station of claim 15, wherein the first clock is updated using information from the beacon transmission.

21. A method performed by a first station for communicating in a network, the first station assigned to a first level in the network, the method comprising:
 receiving, at the first station, a transmission from a second station in a preceding level in the network; and
 synchronizing a first timing information based on the transmission received from the second station in the preceding level, wherein synchronizing the first timing information includes synchronizing a prediction of a periodic time reference based on a second timing information included in the transmission received from the second station.

22. The method of claim 21, wherein synchronizing the first timing information further comprises synchronizing a first clock at the first station used to sample the transmission received from the second station.

23. The method of claim 21, wherein synchronizing the first timing information further comprises synchronizing a first clock at the first station used to prepare a beacon for transmission from the first station.

24. The method of claim 21, wherein the transmission received from the second station includes at least one of: a timestamp of a second clock at the second station, and time delay information indicating a time delay between the periodic time reference and a time associated with the transmission received from the second station.

25. The method of claim 24, wherein synchronizing the first timing information further comprises synchronizing a first clock at the first station based on the timestamp in the transmission received from the second station.

26. The method of claim 24, wherein synchronizing the first timing information further comprises tracking a position in an AC line cycle, and using the time delay information in the transmission received from the second station to predict future occurrences of the periodic time reference relative to the AC line cycle position.

27. The method of claim 26, wherein the position of the AC line cycle includes a zero crossing.

28. The method of claim 26, further comprising using a predicted future occurrence of the periodic time reference in response to not receiving a transmission at an expected time.

29. The method of claim 24, wherein synchronizing the first timing information further comprises tracking a first clock at the first station, and using the time delay information in the transmission received from the second station to a predict future occurrence of the periodic time reference relative to the first clock.

30. The method of claim 29, further comprising updating the first clock using information from a beacon transmission.

* * * * *